United States Patent [19]

Mangum et al.

[11] Patent Number: 5,733,607
[45] Date of Patent: Mar. 31, 1998

[54] METHOD AND APPARATUS FOR COATING AND CURING FIBERGLASS SLEEVING WITH AN ULTRAVIOLET LIGHT CURABLE ACRYLIC

[76] Inventors: Rufus M. Mangum, 570 W. Broad St.; Elliott S. Faircloth, 115 Kinnis Creek Dr., both of Angier, N.C. 27501; Tony Maurice Moore, 529 S. Peedin Ave., Selma, N.C. 27576

[21] Appl. No.: 789,755

[22] Filed: Jan. 28, 1997

Related U.S. Application Data

[60] Provisional application No. 60/010,872, Jan. 31, 1996.
[51] Int. Cl.⁶ ............... B05D 5/12; B05D 3/08; B05D 3/02
[52] U.S. Cl. ............ 427/512; 427/513; 427/106; 427/223; 427/316; 118/72; 118/620; 118/405; 118/DIG. 11; 118/DIG. 12
[58] Field of Search ................. 427/508, 512, 427/513, 553, 558, 105, 223, 316, 407.3, 106; 118/72, 400, 405, 419, 420, 620, 641, 642, DIG. 11, DIG. 12, DIG. 13

[56] References Cited

U.S. PATENT DOCUMENTS

| | | |
|---|---|---|
| 3,635,621 | 1/1972 | Miyauchi et al. . |
| 3,981,705 | 9/1976 | Jaeger et al. . |
| 4,342,794 | 8/1982 | Volker et al. ............... 427/572 |
| 4,518,628 | 5/1985 | Biswas et al. . |
| 4,636,405 | 1/1987 | Mensah et al. . |
| 4,808,963 | 2/1989 | Stunzi et al. ............... 337/246 |
| 4,861,621 | 8/1989 | Kanzaki . |
| 5,000,981 | 3/1991 | McGarry et al. ............... 427/512 |
| 5,084,305 | 1/1992 | Marttila ............... 427/389.2 |
| 5,092,264 | 3/1992 | Overton et al. . |
| 5,128,175 | 7/1992 | Yamanishi et al. . |
| 5,352,392 | 10/1994 | Johnson et al. ............... 427/512 |

*Primary Examiner*—Marianne Padgett
*Attorney, Agent, or Firm*—Rosenthal & Putterman

[57] ABSTRACT

A method and apparatus for coating and curing fiberglass sleeving with an ultraviolet light curable acrylic includes the steps of singeing the fiberglass sleeve at a singeing station and thereafter, cooling the sleeve. The fiberglass sleeve is then coated with an ultraviolet light curable acrylic resin. Thereafter, the coated fiberglass sleeve is cured by passing it through a curing station wherein the sleeve is subjected to ultraviolet light radiation about its entire circumference. The process is speed adjustable and further, the intensity of the light emitted from the ultraviolet light source may be varied so that the system is tuned to cure fiberglass sleeves of any diameter up to approximately 1.00 inch.

4 Claims, 2 Drawing Sheets

METHOD AND APPARATUS FOR COATING AND CURING FIBERGLASS SLEEVING WITH AN ULTRAVIOLET LIGHT CURABLE ACRYLIC

This application claims the benefit of U.S. Provisional Application No. 60/010,872 filed Jan. 31, 1996.

FIELD OF THE INVENTION

This invention relates generally to the field of electrically insulating sleeving and more particularly to a process and apparatus for producing braided fiberglass sleeving that is coated with a polymer and is thereafter cured via the application of 360 degree ultraviolet radiation applied thereto.

BACKGROUND OF THE INVENTION

Electrical sleeving (i.e., braided fiberglass sleeving coated with a cured polymer layer) has long been employed as secondary insulation for electrical connecting wires. The electrical sleeving is produced in diameters ranging from 0.022 inch to about 1.00 inch. The same insulation sleeving is sold to the electrical supply and distribution market for repair and maintenance of electrical appliances and motors. The sleeving is a complex product that must meet rigid requirements for heat resistance, flammability, and dielectric strength as well as resistance to chemicals, cutthrough and abrasion.

The process used to produce electrical sleeving was introduced in the 1920's and has remained substantially unchanged since then. This is due primarily to the fact that the product is a reliable low cost commodity sold primarily to OEM (Original Equipment Manufactures) customers and, to date, there has been no incentive to develop new products or processes.

The fiberglass braid is shipped from the manufacturer wound on spools or festooned in boxes and after being stored in that condition, it attains a somewhat flattened profile. In view of the foregoing, the first step in fabricating the product according to the prior art process is to subject the braid to a singeing process in order to help it recover its cylindrical shape. The braid is therefore loaded on to a de-reeler and is threaded into a "singe" or "burn" station. The singe station consists of an open gas flame through which the braid passes. A heavy steel ball having a diameter roughly equal to the internal diameter of the braid is placed inside the braid and rotates therein as the sleeving is pulled through the singe station. The combination of the heat and the weight of the ball substantially returns the braid to its cylindrical shape. In addition, this operation also removes any stray glass fibers that may be present on the braid and removes (burns off) any impurities that may be present on the outside of the braid.

The sleeving next passes through a dipping trough that contains a pigmentation material. The sleeving then passes through a larger trough that is filled with an acrylic plastic liquid mixed with water and a bonding agent.

The next step is to thread the sleeve through a drying and bonding tower that is located above the plastic dip, to harden the plastic coating. These towers are approximately 35 feet in height and are divided into four heat zones that vary from 200 degrees Fahrenheit to 425 degrees Fahrenheit to vaporize the water content of the plastic and to cause the (acrylic) plastic molecules to bond. It will be appreciated that these drying towers require significant amounts of power in order to maintain the required temperatures, and further, that these numerous towers require a significant amount of floor space. Depending on the properties required, the braid may take several passes through the dip, up the tower, back down through the dip and again through the drying tower. The foregoing process is relatively slow, and depending on diameter, the braid may travel through the process at up to six feet per minute (for the smallest diameters) or as slow as two feet per minute (for the largest diameters). The resulting sleeve has a tough, flexible colored coating with excellent dielectric strength and smoothness. When processing is complete, the sleeve is then cut to length or wound onto a spool for shipment to a customer.

The sleeving is divided into four product classes depending on a number of factors including, strength and heat resistance. Grade C is most prevalent, Grade C2 is the least expensive product, while Grade A and Grade B have more desirable characteristics such as dielectric and heat tolerance, but at a higher cost.

It is accordingly an object of the present invention to provide an improved method of coating and curing a fiberglass braided sleeve with a polymer coating.

Yet another object of the present invention is to provide an improved method of coating and curing a fiberglass braided sleeve with a polymer coating and which operates at a faster rate than currently available processes.

Still another object of the present invention is to provide an improved method of coating and curing a fiberglass braided sleeve with a polymer coating which is less expensive than currently available processes.

A still further object of the present invention is to provide an improved method of coating and curing a fiberglass braided sleeve with a polymer coating which requires less energy than currently available processes.

A still further object of the present invention is to provide an improved method of coating and curing a fiberglass braided sleeve with a polymer coating which requires less factory floor space than currently available processes.

Yet another object of the present invention is to provide an improved apparatus for coating and curing fiberglass sleeving which is less expensive to operate and maintain and which lowers production costs.

SUMMARY OF THE INVENTION

The benefits and advantages of the present invention are achieved in a process for producing a continuous insulated fiberglass sleeve. According to the method, a fiberglass sleeve is passed through a singing station. Thereafter, the fiberglass sleeve is cooled. Next, the fiberglass sleeve is passed through an ultraviolet light curable resin to deposit a coating thereon. The coating provides electrical insulation, abrasion resistance and thermal resistance to the sleeve.

Once the fiberglass sleeve has been coated it then moves to a curing station. The curing station has an ultraviolet light emitting bulb positioned within a mirrored chamber. The ultraviolet bulb is positioned with respect to the coated sleeve so that reflected light completely surrounds and strikes every point on the outer circumference of the sleeve as the sleeve passes through the curing station, whereby the resin deposited thereon is cured.

In another aspect of the invention an apparatus for making a fiberglass sleeve coated with an acrylic resin comprises a singeing station, a coating means for applying an ultraviolet curable resin to the fiberglass sleeve, a curing means for curing the ultraviolet light curable resin, cooling means for cooling the ultraviolet light source and a speed adjustable means for advancing the coated fiberglass sleeve along a path of travel through the singeing station, the coating means, the curing means and on to the take up spool.

BRIEF DESCRIPTION OF THE DRAWINGS

Some of the features and advantages of the present invention having been briefly stated, others will appear from the detailed description which follows, when taken in connection with the accompanying drawings in which.

DETAILED DESCRIPTION OF THE ILLUSTRATED EMBODIMENTS

While the present invention will be described more fully hereinafter with reference to the accompanying drawings in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
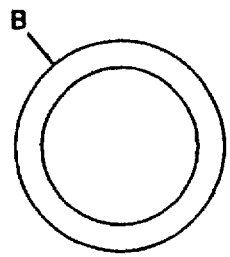
FIG. 1 is a schematic cross-sectional view of the fiberglass braid coated with a polymer according to the present invention.
Figure 2:
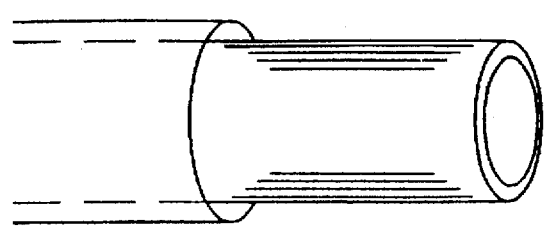
FIG. 2 is a schematic cross-sectional view of the fiberglass braid coated with a polymer according to the present invention.
Figure 3:
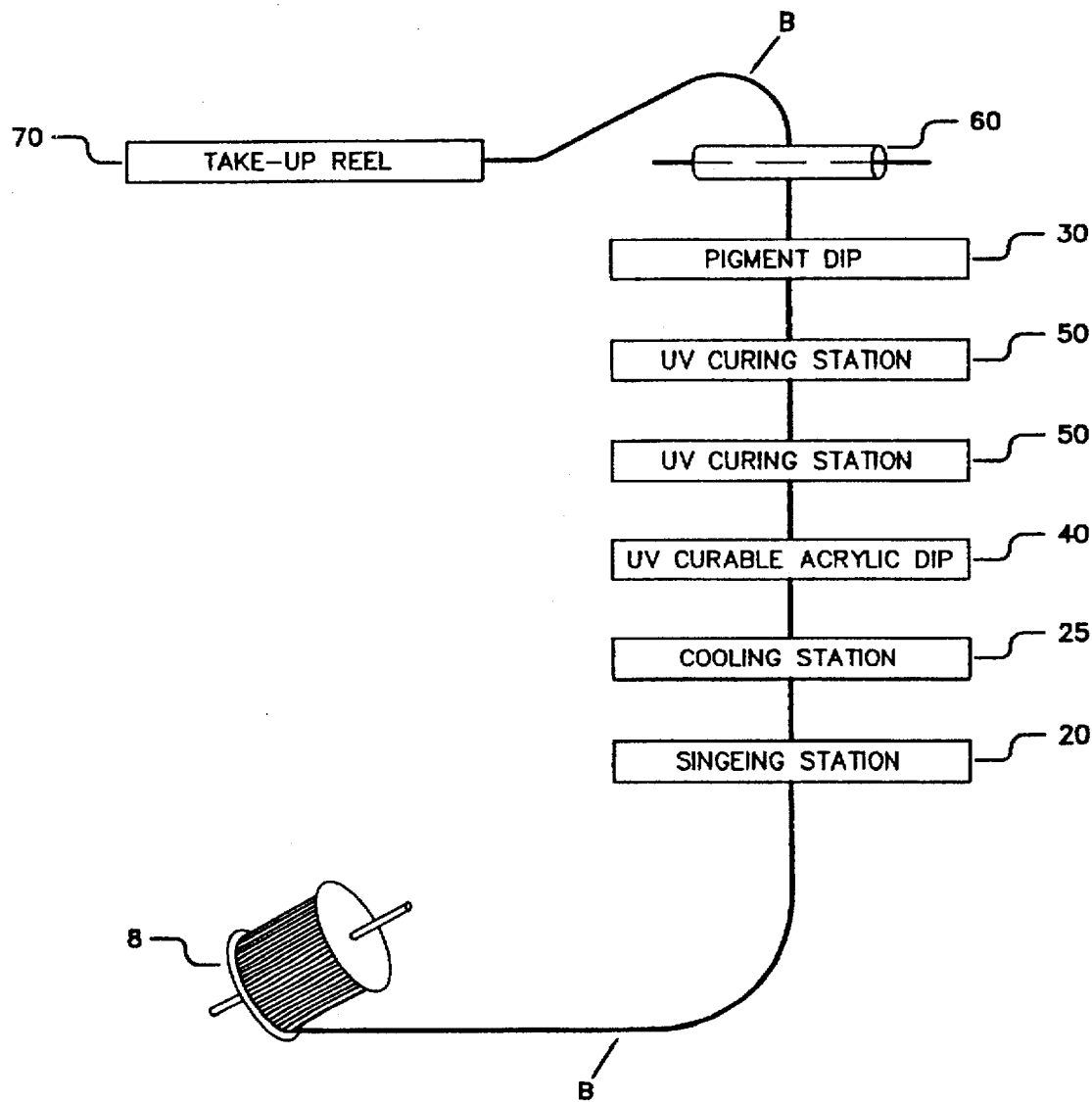
FIG. 3 is a schematic view of the apparatus by which the fiberglass braid is coated with a polymer and cured using ultraviolet light applied around the entire circumference of the braid.

Referring now to the figures, and particularly to FIG. 3, the invention is there illustrated schematically the apparatus for producing the coated fiberglass braid B. The apparatus, in its most basic form, includes a singeing station 20, a station for cooling the braid 25, a station for applying the pigment 30, a station for applying the polymer coating 40, a station for curing the polymer coating 50, and a top guide reel 60.

As previously mentioned, the fiberglass braid B is shipped to customers on reels or spools 8. A spool may hold several hundred feet of 1.00 inch diameter sleeving up to several thousand feet of smaller diameter sleeve material. It will be appreciated that while wound upon the spool, the sleeve becomes somewhat flattened. The degree of flattening is a function of sleeve diameter, placement on the spool, tension with which the sleeving is would on the spool, and other factors. The first process therefore, is to return the sleeving to its cylindrical shape. Thus, reel of sleeving is loaded on to a de-reeler and the sleeve first passes through a conventional singeing station 20, well known to those skilled in the art. At the singeing station 20, a metal ball (not shown) is inserted into the sleeve. The metal ball, usually made of stainless steel has a diameter approximately equal to the internal diameter of the sleeve. The portion of the sleeve having the ball located therein is then passed through an open gas flame or electric singer having a temperature of between about 500 degrees fahrenheit and about 1500 degrees fahrenheit (depending on process speed and sleeve diameter) that "singes" the sleeve. This operation serves to return the sleeving to its original cylindrical shape, and burns off any stray fibers that may be on the braid and also burns off any impurities that may be in the fiber which, after processing could degrade product performance.

It has been determined that due to the high rate of speed at which the present process operates, that the fiberglass braid may require cooling after exiting the singing station in order to insure that it reaches the acrylic dip at the appropriate temperature. This is accomplished by providing a cooling station proximate the singing station exit. The cooling station may comprise a jet or stream of compressed air aimed at short distance at the braid.

After passing through the singeing station, the sleeving may next passes through a dipping trough 40 that contains a that contains an acrylic polymer that is curable with the application of Ultraviolet light (UV). Such polymers have been developed and are available from a number of manufacturers. The foregoing UV curable polymers, when properly applied to the sleeving and properly cured, result in an insulated sleeve that is in compliance with the technical requirements of the Underwriters Laboratory publication UL 1441. Table 19.4 of that publication is an abbreviated listing of 15 quality parameters and the requirements for each with for "600v Grade A Acrylic-coated (Not UV-1 Type) Glass Fiber Sleeving Rated 155 degrees Centigrade. The aging requirement is for 60 days at 190.0+/−1.0 degree C after which the test specimens must pass a minimum 3500v breakdown test. When this polymer is applied according to the present invention, the resultant sleeve satisfies the foregoing Underwriters Laboratory parameters.

Figure 4:
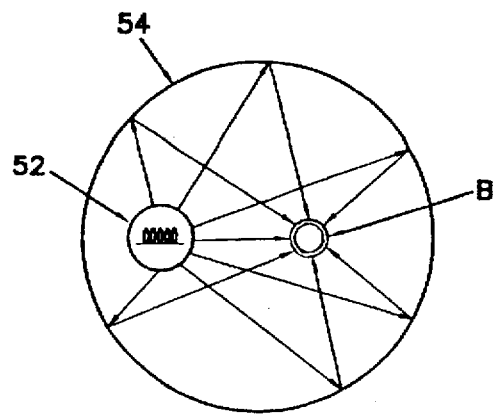
FIG. 4 is a schematic plan view of a fiberglass braid coated with a polymer according to the present invention and passing through the curing station being irradiated with ultraviolet light according to the present invention.
Figure 5:
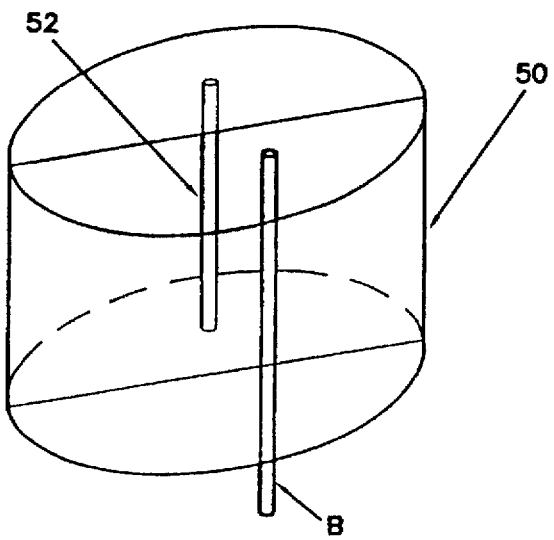
FIG. 5 is a perspective view, broken away of a first embodiment of the ultraviolet light curing station according to the present invention.
Figure 6:
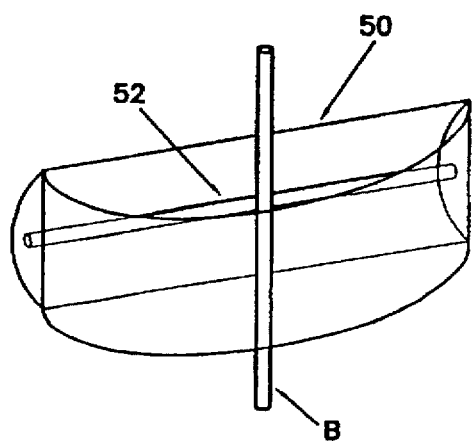
FIG. 6 is a perspective view, broken away of a second embodiment of the ultraviolet light curing station according to the present invention.

After the first coating of acrylic polymer has been applied, it must be cured. The coated fiberglass sleeve is then pulled vertically through a curing station 50. The curing station 50 includes an ultraviolet bulb 52 positioned within a circular mirrored chamber 54 as illustrated in FIG. 4. Curing stations such as are employed in connection with the present invention are available from Fusion UV Systems at 7600 Standish Place in Rockville, Md. 20855-2798. One curing station contains a ten inch long bulb 52 which emits from 300 watts per square inch to 600 watts per square inch and which includes variable light controls. In addition, the position of the UV light bulb 52 is movable with respect to the coated sleeve B so that the reflected light completely surrounds and strikes every point on the outer circumference of the sleeve B as the sleeve passes through the curing station 50. It will be noted that the bulb 52 may positioned vertically, parallel to the direction of travel of the sleeve when smaller diameter sleeves (diameters up to about 12 gauge) are being processed. For diameters over about ⅜ inches in diameter, it is more difficult to surround the coated sleeve with UV light. Therefore, the UV bulb is positioned within the curing station perpendicular to the longitudinal axis of the sleeve. It will be noted that the UV bulbs emit substantial amounts of heat and must therefore be cooled. Each UV bulb is equipped with a cooling fan blows air on the bulb to prevent overheating.

As employed in the present invention, the focal point of the rays emitted from UV bulb 52 is 1.6 inches away from the bulb. Accordingly, the center of the coated sleeve is positionsed at the focal point and the UV rays emitted from the bulb are substantially equally distributed about the entire circumference of the sleleve in order to achieve equal polymer curing about the sleeve periphery.

After the acrylic polymer has been applied and cured, a coloring layer may also be applied at the pigment dip station 30. Polymers that are air cured are employed (i.e., without the necessity for UV light or heat to be applied).

The reader will note that the insulating sleeving is generally available in Grades A,B or C. According to the present invention, Grade A sleeving is comprised of one acrylic polymer layer and an optional color layer. According to the prior art, this required three trips up and down the drying towers, a total distance of more than 100 feet. When the process of the present invention is employed, it is a simple matter to stack resin dispensers 40 and UV curing stations 50 on top of each other so that multiple coats of resin are applied to the sleeve and are cured in a single upward path of travel. In a prototype system that was constructed a singeing station, one acrylic coating and two curing stations were provided in a single apparatus approximately 15 feet high. While only a prototype apparatus has been constructed, it is believed that the rate of curing can be increased from 24 feet per minute to as much as 150 feet per minute for 24 gauge sleeving and from two feet per minute to 30 feet per minute for 1.00 inch sleeving.

As mentioned above, a test apparatus was constructed and the center of 12 gauge sleeving was positioned 1.6 inches from a 600 W ultraviolet light. The test process was able to successfully cure the acrylic polymer at the rate of 80 (eighty) feet per minute. Similarly, a 1.0 inch sleeve was positioned 1.6 inches from a 600 W ultraviolet light and the test process was able to successfully cure the acrylic polymer aht the rate of 20 feet per minute. It is expected that these rates will increase with process refinements.

The sleeving, once cured then passes over a completely level and perfectly cylindrical roller 60 and on to a take up reel 70.

The foregoing embodiment and example(s) are to be considered illustrative, rather than restrictive of the invention, and those modifications which come within the meaning and range of equivalence of the claims are to be included therein.

That which is claimed is:

1. A method of producing a continuous insulated braided fiberglass sleeve of varying diameters up to 1.00 inch, comprising steps of:

passing the braided fiberglass sleeve having a preselected diameter, internal diameter and corresponding outer circumference through a singeing station and wherein the singeing station includes a metal ball of a diameter approximately equal to that of the internal diameter of the braided fiberglass sleeve that is inserted into the braided fiberglass sleeve proximate a flame of the singeing station, and further, wherein the metal ball remains proximate the singeing station as the fiberglass sleeve is pulled therethrouqh, passing the fiberglass sleeve upwardly through an ultraviolet light curable liquid acrylic resin to deposit a resin coating thereon;

pulling the ultraviolet light curable coated braided fiberglass sleeve upward vertically through a curing station, the curing station having an ultraviolet light emitting bulb positioned to reflect light within a mirrored chamber, a fan for cooling the said ultraviolet light bulb, and wherein the fiberglass sleeve is positioned within the chamber so that the reflected light surrounds and strikes the outer circumference of the fiberglass sleeve as the fiberglass sleeve passes through the curing station sufficient to cure the ultraviolet light curable liquid resin deposited on the fiberglass sleeve;

whereby the liquid resin deposited thereon is cured.

2. The method according to claim 1 further including the step of;

adjusting the intensity of light emitted from the ultraviolet light emitting bulb; and adjusting the speed at which the coated fiberglass sleeve passes by the ultraviolet light emitting bulb;

whereby the ultraviolet light curable resin is cured.

3. The method according to claim 1 further including the step of cooling the fiberglass sleeve after the fiberglass sleeve exits the singeing station and before it is coated with the ultraviolet light curable resin.

4. The method according to claim 1 wherein the ultraviolet light emitting bulb comprises an elongate bulb and wherein the ultraviolet light emitting bulb is mounted parallel to the longitudinal axis of the fiberglass sleeve as the fiberglass sleeve passes thereby for said fiberglass sleeve diameters less than about 0.375 inch and alternatively, wherein said ultraviolet light source is mounted perpendicular to the longitudinal axis of the fiberglass sleeve as the fiberglass sleeve passes thereby for said fiberglass sleeve diameters greater than about 0.375 inch.

* * * * *